(12) United States Patent
Shin et al.

(10) Patent No.: US 9,442,519 B2
(45) Date of Patent: Sep. 13, 2016

(54) PROTECTION CASE FOR ELECTRONIC DEVICE AND ELECTRONIC DEVICE INCLUDING THE SAME

(71) Applicant: Samsung Electronics Co., Ltd., Gyeonggi-do (KR)

(72) Inventors: Chang-bong Shin, Gyeonggi-do (KR); Kyu-suk Lee, Gyeonggi-do (KR); Seung-heon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/546,198

(22) Filed: Nov. 18, 2014

(65) Prior Publication Data
US 2015/0169010 A1   Jun. 18, 2015

(30) Foreign Application Priority Data
Dec. 17, 1920 (KR) .................. 10-2013-0157530

(51) Int. Cl.
| | |
|---|---|
| *G06F 1/16* | (2006.01) |
| *H04M 1/18* | (2006.01) |
| *H04M 1/02* | (2006.01) |
| *H04M 1/725* | (2006.01) |

(52) U.S. Cl.
CPC ............ *G06F 1/1626* (2013.01); *H04M 1/185* (2013.01); *G06F 2200/1633* (2013.01); *H04M 1/0214* (2013.01); *H04M 1/72527* (2013.01); *H04M 2250/16* (2013.01)

(58) Field of Classification Search
CPC .. G06F 1/1641; G06F 1/1632; G06F 1/1637; G06F 15/0216; G06F 1/1681; G06F 1/1626; G06F 2200/1633; H05K 1/189; B65D 25/20; H04M 1/185; H04M 1/0214; H04M 1/72527; H04M 2250/16

USPC ............... 361/679.21, 679.26, 679.27, 361/679.55–679.58; 455/575.1–575.4
See application file for complete search history.

(56) References Cited

U.S. PATENT DOCUMENTS 6,510,325 B1 *   1/2003   Mack, II ............. H04M 1/6041
                                                        348/14.01
7,864,524 B2 *   1/2011   Ladouceur ............ G06F 1/1616
                                                        361/679.55

(Continued)

FOREIGN PATENT DOCUMENTS

| KR | 2003-0063638 | 7/2003 |
|---|---|---|
| KR | 2010-0082920 | 7/2010 |

(Continued)

*Primary Examiner* — Anthony Haughton
*Assistant Examiner* — Ingrid Wright
(74) *Attorney, Agent, or Firm* — The Farrell Law Firm, P.C.

(57) ABSTRACT

A protection case and an electronic device using the same are provided. The protection case includes a base cover in which an electronic device including a main display is accommodated, a flip cover, which includes an auxiliary display on a front surface portion of the flip cover, and a connection portion, which connects the flip cover to the base cover. When the main display is covered with the flip cover, the flip cover is converted to a closed position. When the main display is exposed, the flip cover is converted to an opened position. When the flip cover is in the closed position and the auxiliary display is hidden, the auxiliary display is converted to a first position, and when the flip cover is in the closed position and the auxiliary display is exposed, the auxiliary display is converted to a second position.

18 Claims, 13 Drawing Sheets

(56) References Cited

U.S. PATENT DOCUMENTS

| 8,634,873 B2 * | 1/2014 | Jones | H04M 1/0235 |
| | | | 455/41.2 |
| 8,760,405 B2 | 6/2014 | Nam | |
| 2010/0177036 A1 | 7/2010 | Nam | |
| 2011/0065474 A1 | 3/2011 | Won et al. | |
| 2012/0194308 A1 | 8/2012 | Lauder et al. | |
| 2012/0212430 A1 | 8/2012 | Jung et al. | |
| 2013/0050164 A1 | 2/2013 | Rericha | |

FOREIGN PATENT DOCUMENTS

| KR | 2012-0065287 | 6/2012 |
| KR | 2012-0005719 | 8/2012 |
| KR | 2012-0089973 | 8/2012 |
| KR | 1188978 | 10/2012 |
| KR | 2012-0124194 | 11/2012 |
| KR | 1212133 | 12/2012 |

* cited by examiner

PROTECTION CASE FOR ELECTRONIC DEVICE AND ELECTRONIC DEVICE INCLUDING THE SAME

PRIORITY

This application claims priority under 35 U.S.C. §119(a) to Korean Patent Application No. 10-2013-0157530, filed on Dec. 17, 2013 in the Korean Intellectual Property Office, the entire disclosure of which is incorporated herein by reference.

BACKGROUND

1. Field of the Invention

The present invention relates generally to a protection case that protects a display of an electronic device and an electronic device including the protection case.

2. Description of the Related Art

Mobile electronic devices, such as a communication terminal, a multimedia device, a portable computer, or a photographing apparatus, particularly, portable electronic devices, include a display that displays image information thereon. An electronic device may include a protection case to protect the display. The protection case typically includes a base cover that accommodates the electronic device so as to expose the display and a flip cover that opens or closes the display. The base cover and the flip cover are connected so as to be foldable.

However, as the size of portable electronic devices is limited for the sake of portability, the size of the display may also be limited.

SUMMARY

The present invention has been made to address at least the problems and disadvantages described above, and to provide at least the advantages described below.

Accordingly, an aspect of the present invention is to provide a protection case for an electronic device, which is capable of converting an auxiliary display included in a flip cover of the protection case to face inward or outward, and an electronic device including the protection case.

In accordance with an aspect of the present invention, a protection case for an electronic device is provided. The protection case includes a base cover in which an electronic device including a main display is accommodated, a flip cover, which includes an auxiliary display on a front surface portion of the flip cover, and a connection portion, which connects the flip cover to the base cover. When the main display is covered with the flip cover, the flip cover is converted to a closed position. When the main display is exposed, the flip cover is converted to an opened position. When the flip cover is in the closed position and the auxiliary display is hidden, the auxiliary display is converted to a first position. When the flip cover is in the closed position and the auxiliary display is exposed, the auxiliary display is converted to a second position.

In accordance with an aspect of the present invention, an electronic device is provided. The electronic device includes a main body including a main display, a battery cover which accommodates the main body such that the main display is exposed, a flip cover including an auxiliary display on a front surface portion of the flip cover, and a connection portion which connects the flip cover to the battery cover. When the main display is covered with the flip cover, the flip cover is converted to a closed position. When the main display is exposed, the flip cover is converted to an opened position. When the flip cover is in the closed position and the auxiliary display is hidden, the auxiliary display is converted to a first position. When the flip cover is in the closed position and the auxiliary display is exposed, the auxiliary display is converted to a second position.

BRIEF DESCRIPTION OF THE DRAWINGS

The above and other aspects, features, and advantages of the present invention will become more apparent from the following detailed description of the embodiments, taken in conjunction with the accompanying drawings in which.

DETAILED DESCRIPTION OF EMBODIMENTS OF THE PRESENT INVENTION

Figure 1A:
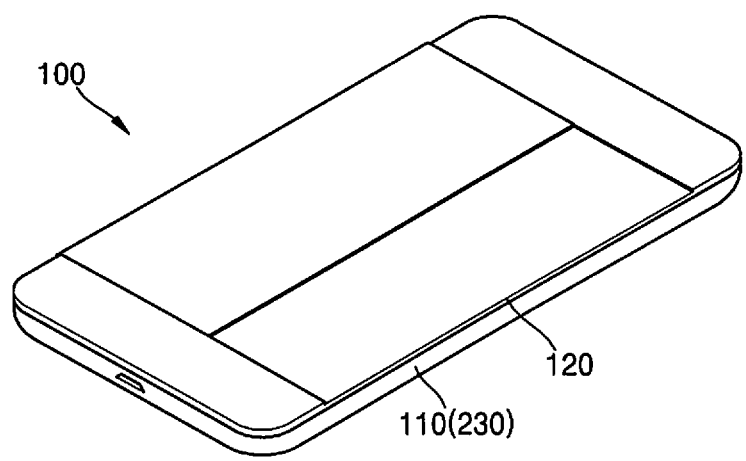
FIGS. 1A and 1B are a perspective view and a front view, respectively, of a protection case, illustrating a flip cover of the protection case, which is closed, according to an embodiment of the present invention.

Hereinafter, various embodiments of the present invention will be described more specifically with reference to the accompanying drawings. It should be noted that throughout the drawings, like reference numerals refer to like elements and sizes or thickness of elements may be exaggerated for clarity of description. In this regard, the present embodiments may have different forms and should not be construed as being limited to the descriptions set forth herein. Accordingly, the embodiments are merely described below, by referring to the figures, to explain aspects of the present invention.

Figure 1B:
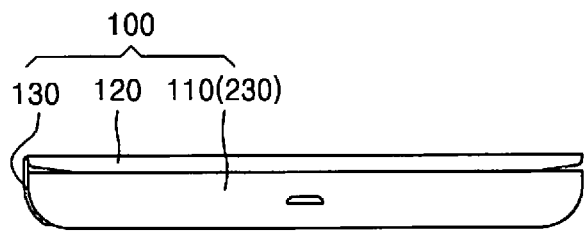

FIGS. 1A and 1B are a perspective view and a front view, respectively, of a protection case, illustrating a flip cover of the protection case, which is closed, according to an embodiment of the present invention.

Referring to FIGS. 1A and 1B, a protection case is provided. The protection case 100 includes the base cover 110 and the flip cover 120. The base cover 110 and the flip cover 120 are connected to each other via a connection portion 130.

Figure 2A:
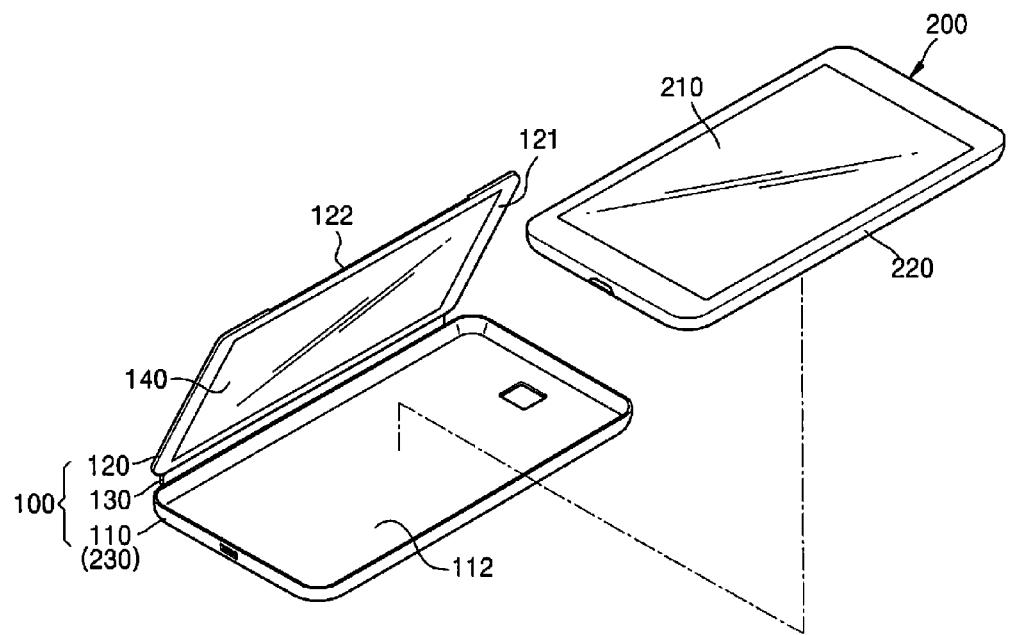
FIGS. 2A and 2B are a perspective view and a front view, respectively, of a protection case, illustrating a flip cover of the protection case, which is partially opened, according to an embodiment of the present invention.
Figure 2B:
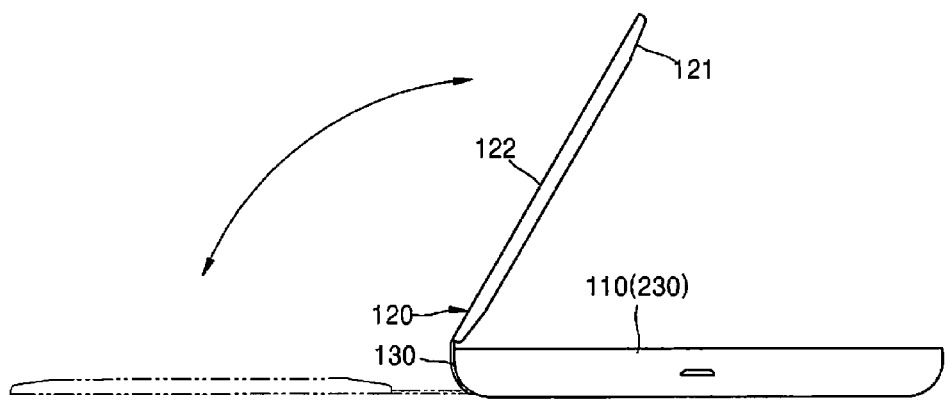

FIGS. 2A and 2B are a perspective view and a front view, respectively, of a protection case, illustrating a flip cover of the protection case, which is partially opened, according to an embodiment of the present invention.

Figure 2C:
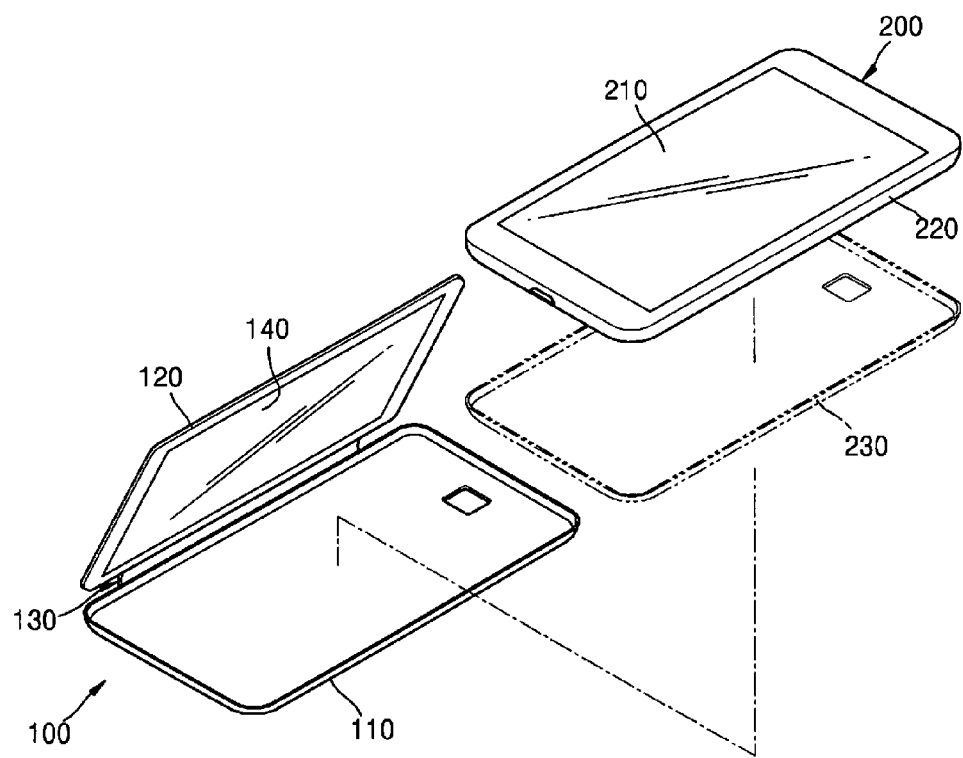
FIG. 2C is a perspective view of a protection case having a structure in which a base cover replaces a battery cover of an electronic device, according to an embodiment of the present invention.

FIG. 2C is a perspective view of a protection case having a structure in which a base cover replaces a battery cover of an electronic device, according to an embodiment of the present invention.

Referring to FIGS. 2A, 2B, and 2C, a protection case and an electronic device are provided. The electronic device 200 may be a portable electronic device, such as a communication terminal, a game machine, a multimedia device, a portable computer or a photographing apparatus. The electronic device 200 includes a main body 220, including the main display 210, for displaying an image, and the battery cover 230 for covering a backside of the main body 220. The battery cover 230 may be separated from the main body 220 to replace a battery mounted in the main body 220. The electronic device 200 may include a processing unit and an input and output unit that perform functions according to the device's usages. For example, when the electronic device 200 is a multimedia terminal whereby images and music can be viewed and listened, the processing unit may include an image/sound information processing unit. When the electronic device 200 is a communication terminal, the processing unit may include a communication module. The input and output unit may include an image/sound input and output unit and a manipulation unit for user manipulation.

As illustrated in FIG. 2A, the base cover 110 includes an opening 112. When the electronic device 200 is accommodated in the base cover 110, the main display 210, provided in the electronic device 200, is exposed through the opening 112.

Alternatively, referring to FIG. 2C, the base cover 110 may replace the battery cover 230 of the electronic device 200. That is, the battery cover 230 may be removed from the main body 220 and the base cover 110 may be directly mounted on the backside of the main body 220. According to this structure, the base cover 110 functions as the battery cover 230 and the protection case 100 functions as an element of the electronic device 200. Hereinafter, the base cover 110 refers to the base cover 110 or the battery cover 230, and the reference numeral 110 indicating the base cover and the reference numeral 230 indicating the battery cover will be both marked in the drawings.

The connection portion 130 connects the flip cover 120 to the base cover 110 such that the flip cover 120 may be moved to a closed position where the main display 210 is covered (FIGS. 1A and 1B) and an opened position where the main display 210 is exposed (FIGS. 2A and 2B). The flip cover 120 includes a front surface portion 121 on which an auxiliary display 140 is disposed and a rear surface portion 122 on the opposite side of the front surface portion 121.

According to this structure, when the flip cover 120 is located at the closed position as illustrated in FIGS. 1A and 1B, the flip cover 120 covers the main display 210 to protect the same. Also, when the flip cover 120 is completely opened as denoted by the dotted line in FIG. 2B, the main display 210 and the auxiliary display 140 are exposed so as to display image information by using the main display 210 and the auxiliary display 140.

Figure 4A:
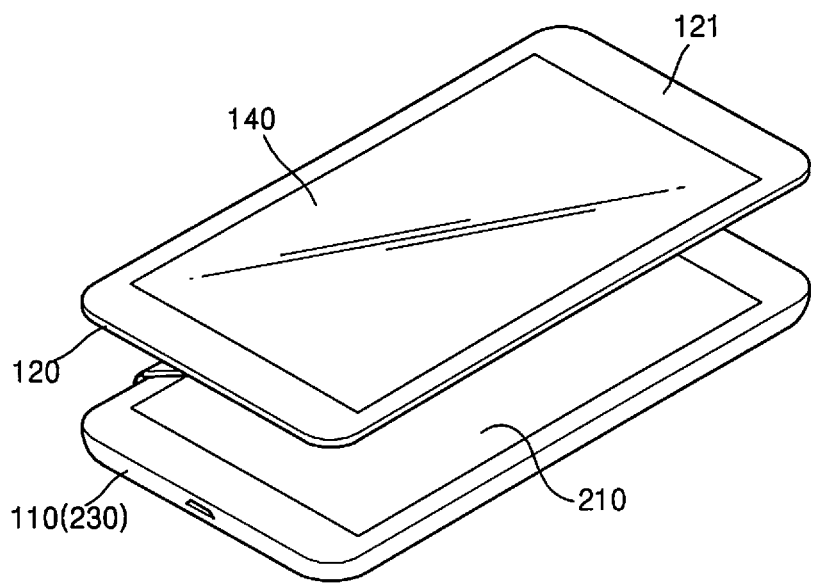
FIGS. 4A and 4B are a perspective view and a front view, respectively, of a protection case, illustrating a state in which an auxiliary display of a flip cover of the protection case is exposed to the outside, according to an embodiment of the present invention.
Figure 4B:
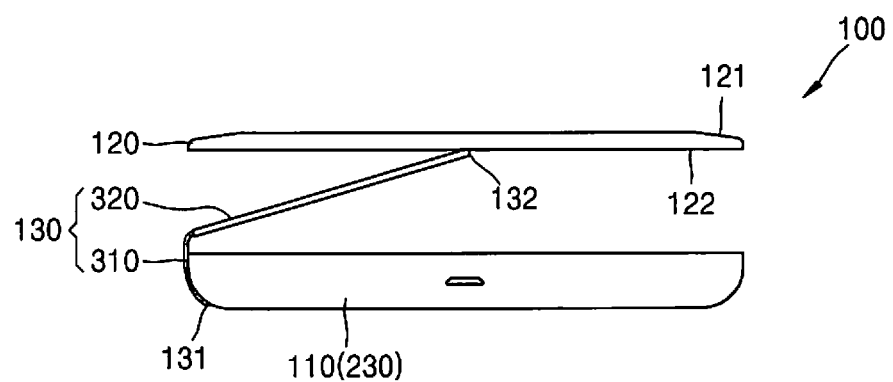

The protection case 100 includes the connection portion 130 that selectively positions the auxiliary display 140, when the flip cover 120 is located at the closed position, such that the auxiliary display 140 is hidden inside the protection case 100 (the first position) as shown in FIGS. 1A and 1B or is exposed outside the protection case 100 (the second position) as shown in FIGS. 4A and 4B.

Figure 3A:
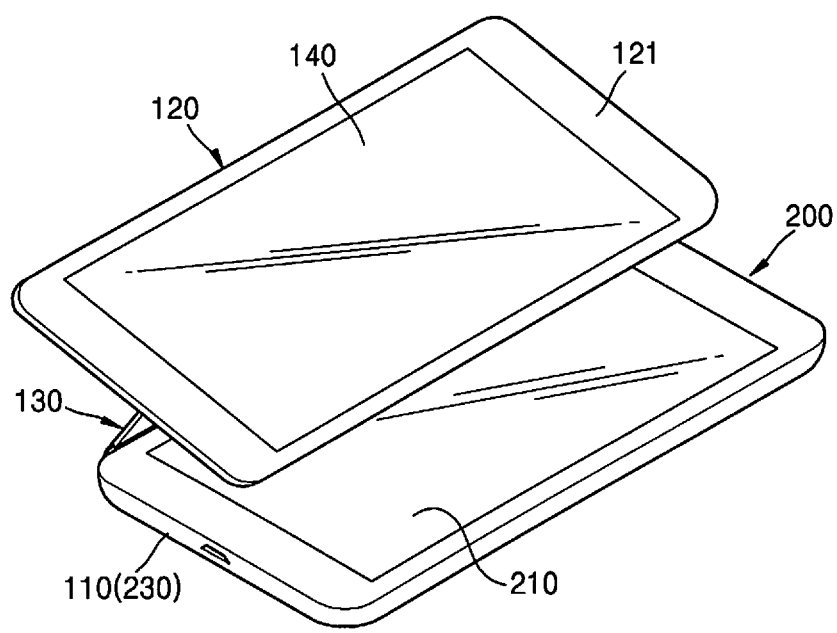
FIGS. 3A and 3B are a perspective view and a front view, respectively, of a protection case, illustrating a flip cover of the protection case pivoting with respect to a second end portion of a connection portion of the protection case, according to an embodiment of the present invention.
Figure 3B:
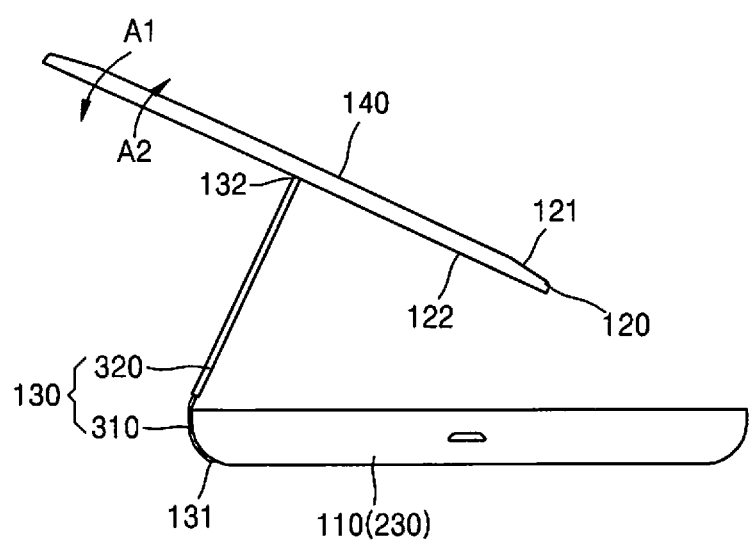

FIGS. 3A and 3B are a perspective view and a front view, respectively, of a protection case, illustrating a flip cover of the protection case pivoting with respect to a second end portion of a connection portion of the protection case, according to an embodiment of the present invention.

FIGS. 4A and 4B are a perspective view and a front view, respectively, of a protection case, illustrating a state in which an auxiliary display of a flip cover of the protection case is exposed to the outside, according to an embodiment of the present invention.

Figure 5A:
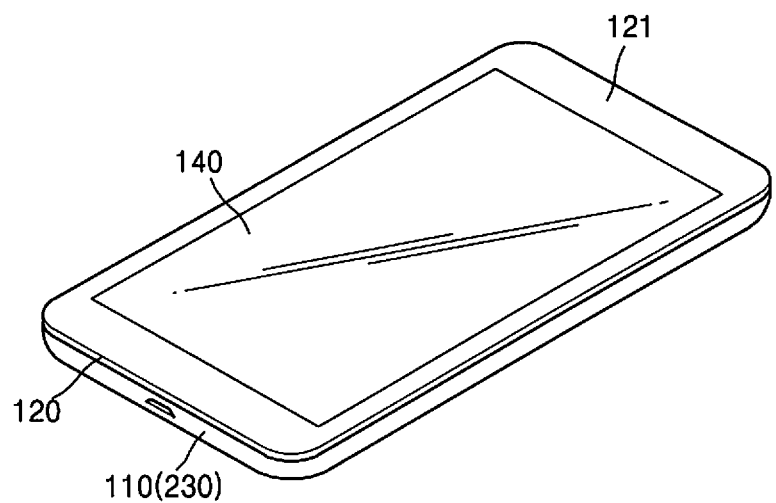
FIGS. 5A and 5B are a perspective view and a front view, respectively, of the protection case, illustrating a flip cover of the protection case, which is closed while an auxiliary display of the flip cover is exposed to the outside, according to an embodiment of the present invention.
Figure 5B:
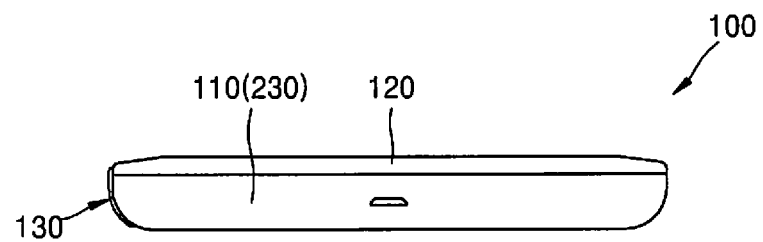

FIGS. 5A and 5B are a perspective view and a front view, respectively, of the protection case, illustrating a flip cover of the protection case, which is closed while an auxiliary display of the flip cover is exposed to the outside, according to an embodiment of the present invention.

Referring to FIGS. 3A, 3B, 4A, 4B, 5A and 5B, the connection portion 130 includes a first end portion 131 that is connected to the base cover 110 and a second end portion 132 that extends from the first end portion 131 to be connected to a center portion of a rear surface portion 122 of the flip cover 120. The center portion refers to a center portion with respect to a folding direction. The flip cover 120 is pivotably connected to the second end portion 132. By pivotably connected, it is meant that the flip cover 120 is connected to the second end portion 132 in a manner that allows for pivoting of the flip cover 120.

While the flip cover 120 is partially opened with respect to the base cover 110, as shown in FIGS. 3A and 3B, when the flip cover 120 is pivoted with respect to the second end portion 132 in a direction A1, the rear surface portion 122 of the flip cover 120 faces the main display 210, as shown in FIGS. 4A and 4B. When the flip cover 120 is moved to the closed position in this state, as shown in FIGS. 5A and 5B, the auxiliary display 140 is located at the second position where the auxiliary display 140 is exposed outside.

While in the state as shown in FIGS. 3A and 3B, when the flip cover 120 is pivoted with respect to the second end portion 132 in a direction A2, the front surface portion 121 of the flip cover 120 faces the main display 210. When the flip cover 120 is completely opened in this state, as denoted by the dotted line in FIG. 2B, the main display 210 and the auxiliary display 140 are positioned side by side. When the flip cover 120 is completely closed as shown in FIGS. 1A and 1B, the auxiliary display 140 is located at the first position where it is hidden inside.

Figure 6:
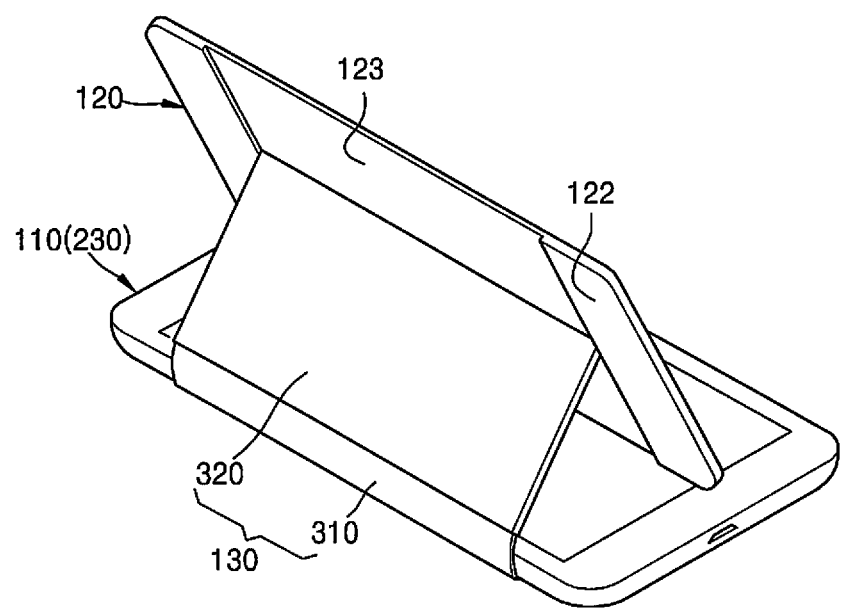
FIG. 6 is a perspective view of a protection case, illustrating a manner of connection between a flip cover and a second end portion of a connection portion of the protection case, according to an embodiment of the present invention.

FIG. 6 is a perspective view of a protection case, illustrating a manner of connection between a flip cover and a second end portion of a connection portion of the protection case, according to an embodiment of the present invention.

Figure 7:
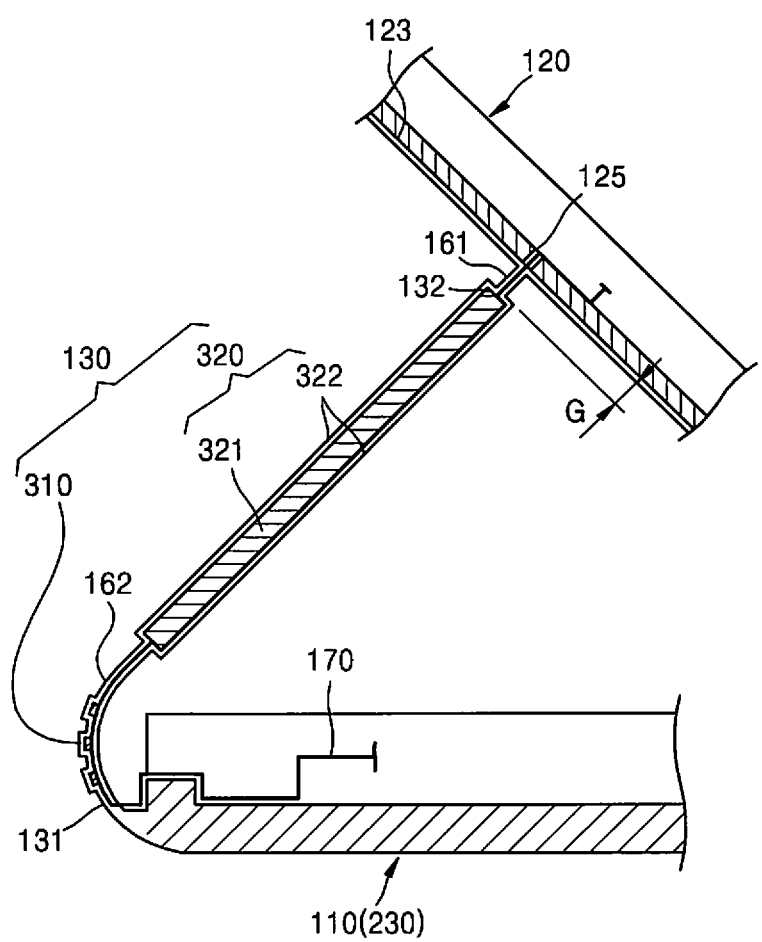
FIG. 7 is a partial cross-sectional view of a protection case, illustrating a connection between a flip cover and a second end portion of a connection portion of the protection case, according to an embodiment of the present invention.

FIG. 7 is a partial cross-sectional view of a protection case, illustrating a connection between a flip cover and a second end portion of a connection portion of the protection case, according to an embodiment of the present invention.

Referring to FIGS. 6 and 7, a depression portion 123 is provided in the rear surface portion 122 of the flip cover 120, where the depression portion 123 is internally depressed toward the front surface portion 121. A depth and width of the depression portion 123 is equal to or slightly larger than a thickness and width of a portion of the connection portion 130 that is overlapped with the flip cover 120 to accommodate the overlapping portion.

The connection portion 130 includes a first connection portion 310 extended from the first end portion 131 and a second connection portion 320 extended from the second end portion 132 and connected to the first connection portion 310. The second connection portion 320 is overlapped with the flip cover 120. The first connection portion 310 has a foldable structure, and the second connection portion 320 is a planar plate. The first connection portion 310 may be any foldable structure such as a flexible polymer, artificial leather, leather, or a multi joint structure.

For example, in an embodiment of the present invention, a pivotable connection structure between the second end portion 132 and the flip cover 120 is implemented by using a flexible joint 161. The second connection portion 320 includes a core 321 that is planar and a cladding 322 that is flexible and surrounds the core 321. The flexible cladding 322 may include, for example, a flexible textile, leather, artificial leather, or the like. The cladding 322 may be coupled to the core 321 by, for example, bonding or fusion. The cladding 322 is extended from the second end portion 132 to be adhered to the depression portion 123 of the rear surface portion 122 of the flip cover 120. The second end portion 132 and the depression portion 123 are spaced apart from each other by a gap G. The flexible joint 161 is formed of the cladding 322 within the gap G. The cladding 322 and the depression portion 123 are adhered to each other by, for example, bonding or fusion. Also, as illustrated in FIG. 7, the first connection portion 310 and the second connection portion 320 are also connected to each other via a joint 162 that is formed in a similar manner. A connection position at which the second end portion 132 and the flip cover 120 are connected to each other is around the center portion of the flip cover 120 with respect to a folding direction, and the connection position may deviate toward one side in consideration of a thickness of the flip cover 120. A deviation amount is determined such that outer portions of the flip cover 120 and the base cover 110 are aligned without deviation from each other when the auxiliary display 140 is located at the first position, as shown in FIGS. 1A and 1B, and the second position, as shown in FIGS. 5A and 5B. The deviation amount may be 1.5 times or less the thickness of the flip cover 120.

A signal line 170 that connects the electronic device 200 and the auxiliary display 140 extends from the base cover 110 along the connection portion 130 and passes through the flip cover 120 to be connected to the auxiliary display 140. For example, in an embodiment of the present invention, the signal line 170 extends between the core 321 and the cladding 322 to pass through a slot 125 formed in the flip cover 120 so as to be connected to the auxiliary display 140. The signal line 170 is connected to a connection terminal provided in the electronic device 200 when the electronic device 200 is mounted to the base cover 110. Also, an end portion of the signal line 170 is connected to a connector included in the electronic device 200 so as to be connected to the electronic device 200.

Alternatively, the second end portion 132 of the connection portion 130 and the flip cover 120 are connected using a hinge structure.

Figure 8:
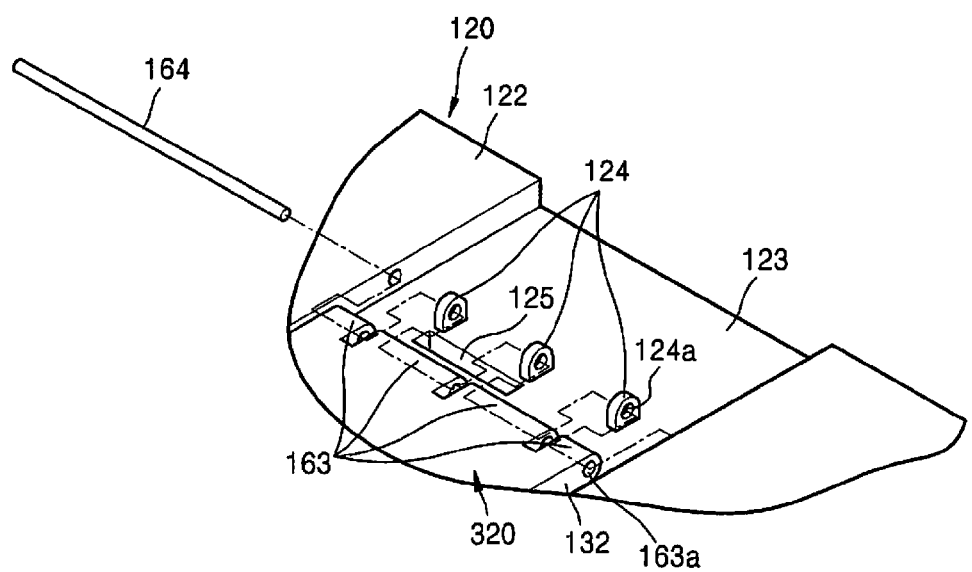
FIG. 8 is a perspective view of a hinge structure, according to an embodiment of the present invention.

FIG. 8 is a perspective view of a hinge structure, according to an embodiment of the present invention.

Referring to FIG. 8, the second end portion 132 includes a plurality of first hinge portions 163 each having a first through hole 163a. The depression portion 123 of the flip cover 120 includes a plurality of second hinge portions 124 each having a second through hole 124a. After aligning the first and second through holes 163a and 124a, a pivot shaft 164 is inserted into the first and second through holes 163a and 124a so as to pivotably connect the flip cover 120 to the second end portion 132 of the connection portion 130. The pivot shaft 164 is inserted into the first and second through holes 163a and 124a from the side of the front surface portion 121 before assembling the auxiliary display 140 to the flip cover 120. The second connection portion 320 includes the core 321 and the cladding 322, as shown in FIG. 7. The plurality of first hinge portions 163 are provided in the core 321. Slot 125 denotes a slot through which the signal line 170 passes. The signal line 170 extends between the core 321 and the cladding 322 so as to be connected to the auxiliary display 140 through the slot 125.

In the above-described embodiment, although the signal line 170 is disposed between the core 321 and the cladding 322, the scope of the embodiments of the present invention is not limited thereto. For example, while not illustrated in the drawings, the signal line 170 may be adhered to an internal surface of the connection portion 130, that is, a surface of the connection portion 130 facing the base cover 110. Also, the signal line 170 may be disposed as a patterned wire on the internal surface of the connection portion 130. That is, the surface of the connection portion 130 facing the base cover 110, and both ends of the signal line 170 may be in the form of flexible cables and extend into inner portions of the base cover 110 and the flip cover 120 so as to be connected to the main body 220 and the auxiliary display 140.

According to the above-described structure, various usage states of the protection case may be provided to the user: the closed position (i.e., the first position, as shown in FIGS. 1A and 1B) at which the main display 210 and the auxiliary display 140 are not exposed to the outside, the opened position (i.e., the state denoted by a dotted line in FIG. 2B) at which both the main display 210 and the auxiliary display 140 are exposed to the outside, and the closed position (i.e., the second position, as shown in FIGS. 5A and 5B) at which only the auxiliary display 140 is exposed to the outside. Also, the electronic device 200 may display appropriate image information on the main display 210 and the auxiliary display 140, according to an exposed state of the main display 210 and the auxiliary display 140.

While the flip cover 120 is located at the first and second positions, such that the flip cover 120 is closely adhered to the portion of the connection portion 130 that overlaps the flip cover 120 (i.e., the second connection portion 320), the flip cover 120 and the second connection portion 320 are adhered to each other via a magnetic force.

Figure 9:
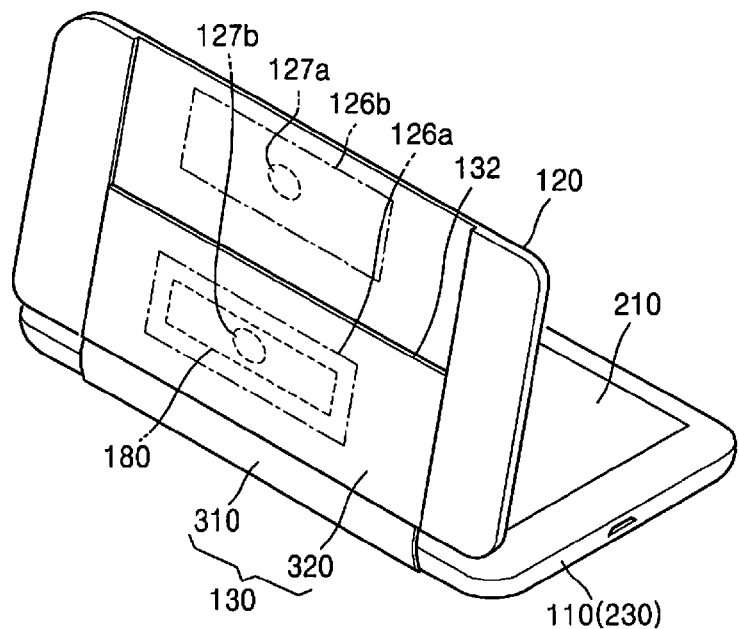
FIGS. 9 and 10 are diagrams of a protection case, illustrating a state in which a flip cover of the protection case is closely adhered to a second connection portion of the flip cover at a first position and a second position, respectively, according to an embodiment of the present invention.
Figure 10:
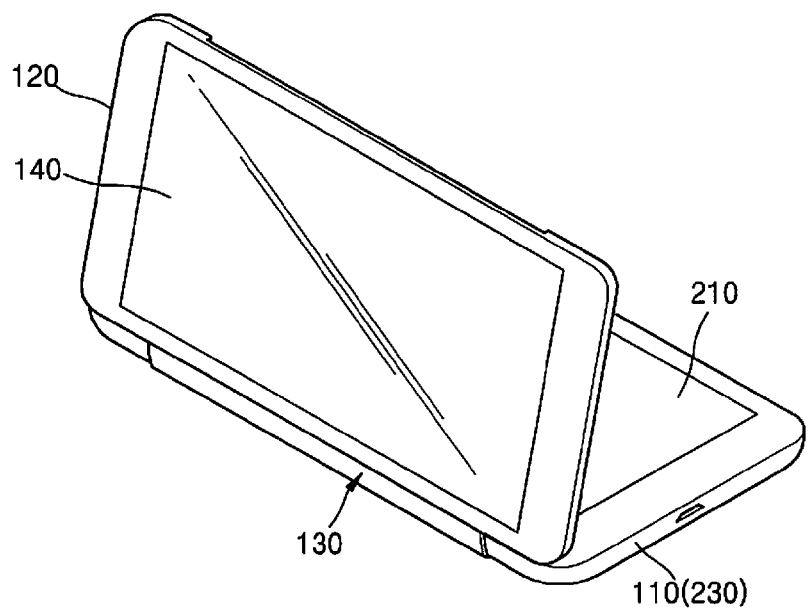

FIGS. 9 and 10 are diagrams of a protection case, illustrating a state in which a flip cover of the protection case is closely adhered to a second connection portion of the flip cover at a first position and a second position, respectively, according to an embodiment of the present invention.

Referring to FIG. 9, a magnet 180 is disposed on the second connection portion 320 as denoted by the dotted line. First and second adhesion members 126a and 126b, which are adhered to the magnet 180, are disposed on the flip cover 120 as denoted by the alternating long and short dashed line. The first and second adhesion members 126a and 126b may be, for example, iron plates. The first and second adhesion members 126a and 126b are symmetrically disposed with respect to the second end portion 132.

According to this structure, when the flip cover 120 is located at the first position, as shown in FIG. 9, the magnet 180 and the first adhesion member 126a are adhered to each other. Also, when the flip cover 120 is located at the second position as shown in FIG. 10, the magnet 180 and the second adhesion member 126b are adhered to each other. Although not illustrated in the drawings, alternatively, two magnets 180 may be disposed on the flip cover 120, instead of the first and second adhesion members 126a and 162b, and an adhesion member may be disposed on the second connection portion 320, instead of the magnets 180.

A position detecting unit that detects at which of the first and second positions the flip cover 120 is located is further included. The position detecting unit may include, for example, a magnetic sensor that detects a magnetic force of the magnet 180. The magnetic sensor may be, for example, a Hall element. For example, as shown in FIG. 9, when the magnet 180 is disposed on the second connection portion 320 and the first and second adhesion members 126a and 126b are disposed on the flip cover 120, first and second Hall elements 127a and 127b are spaced apart from each other by the center portion, to which the second end portion 132 are connected. According to this structure, when the flip cover 120 is located at the first position, as shown in FIG. 9, the magnet 180 and the first Hall element 127a face each other, thereby detecting a magnetic force of the magnet 180 by using the first Hall element 127a. Also, when the flip cover 120 is located at the second position, as shown in FIG. 10, the magnet 180 and the second Hall element 127b face each other, thereby detecting a magnetic force of the magnet 180 by using the second Hall element 127b. Accordingly, by determining whether a magnetic force is detected by using the first and second Hall elements 127a and 127b, it may be detected at which of the first and second positions the flip cover 120 is located. Detection signals of the first and second Hall elements 127a and 127b are transmitted to the electronic device 200, for example, via the signal line 170. The electronic device 200 may confirm a position of the auxiliary display 140 and display appropriate image information on the main display 210 or the auxiliary display 140, based on the received detection signals.

Referring to Table 1, the electronic device 200 determines a state of the flip cover 120 (i.e., an opened state or a closed state) and a position of the flip cover 120 (i.e., the first position or the second position), based on detection signals of a proximity sensor 240, as shown in FIG. 11, embedded in the electronic device 200 and of the first and/or second Hall elements 127a and 127b. In Table 1, "ON" and "OFF" refer to a state in which the flip cover 120 or the magnet 180 is detected and a state in which they are not detected, respectively, by using the proximity sensor 240 or the first and/or second Hall elements 127a and 127b.

TABLE 1

| State of flip cover | position of flip cover | proximity sensor | first Hall element | second Hall element |
| --- | --- | --- | --- | --- |
| opened state | first position | ON | ON | OFF |
|  | second position | ON | OFF | ON |
| closed state | first position | OFF | ON | OFF |
|  | second position | OFF | OFF | ON |

If only one of the first and second Hall elements 127a and 127b is disposed, a position of the flip cover 120 (the first or second position) is detected according to an ON or OFF state of the one Hall element. However, in this case, the electronic device 200 is not able to determine whether the position of the flip cover 120 is one in which the position of the flip cover 120 is convertible to the first or second position in the protection case 100. If the first and second Hall elements 127a and 127b are both disposed, one of them is maintained to be always in an "ON" state so that the electronic device 200 is able to recognize that the protection case 100 is a protection case in which the position of the flip cover 120 is convertible to the first or second position.

Figure 11A:
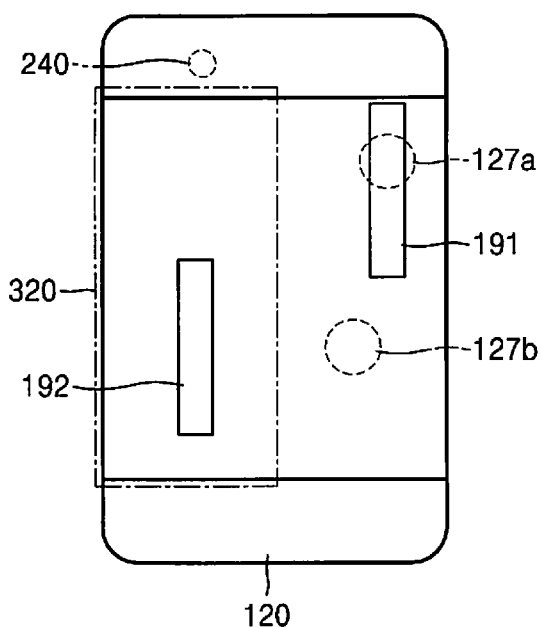
FIGS. 11A and 11B are planar views of a flip cover of a protection case, illustrating a position detecting unit, which detects a position of the flip cover, according to an embodiment of the present invention.
Figure 11B:
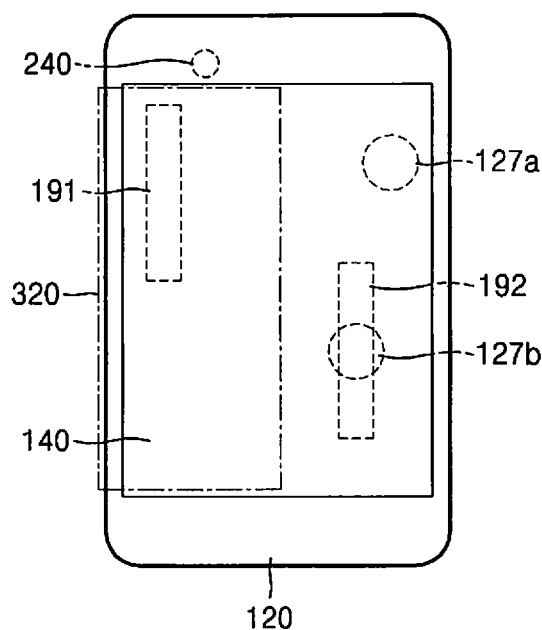

FIGS. 11A and 11B are planar views of a flip cover of a protection case, illustrating a position detecting unit, which detects a position of the flip cover, according to an embodiment of the present invention.

Referring to FIGS. 11A and 11B, the flip cover is shown with the auxiliary display 140 located at the first and second positions, respectively. The second connection portion 320 is denoted by an alternating long and short dashed line. First and second magnets 191 and 192 are disposed on the flip cover 120, and the first and second Hall elements 127a and 127b are disposed on the electronic device 200. In this case, an adhesion member, which is adhered to the second magnet 192 and the first magnet 191 when the auxiliary display 140 is located at the first position and the second position, respectively, is provided on the second connection portion 320. The first and second magnets 191 and 192 are asymmetrically disposed with respect to the center portion of the flip cover 120. As shown in FIG. 11A, when the auxiliary display 140 is located at the first position, the first magnet 191 and the first Hall element 127a face each other. Also, as shown in FIG. 11B, when the auxiliary display 140 is located at the second position, the second magnet 192 and the second Hall element 127b face each other.

According to this structure, the same result as shown in Table 1 may be obtained by a combination of detection signals of the first and second Hall elements 127a and 127b and a detection signal of the proximity sensor 240.

The protection case 100 may further be maintained in a state in which the auxiliary display 140 faces in the direction of the main display 210 at the first position, and is positioned to be inclined perpendicularly with respect to the base cover 110 at a predetermined angle. To this end, the second connection portion 320 may include a plurality of segment members that are pivotably connected with one another.

Figure 12:
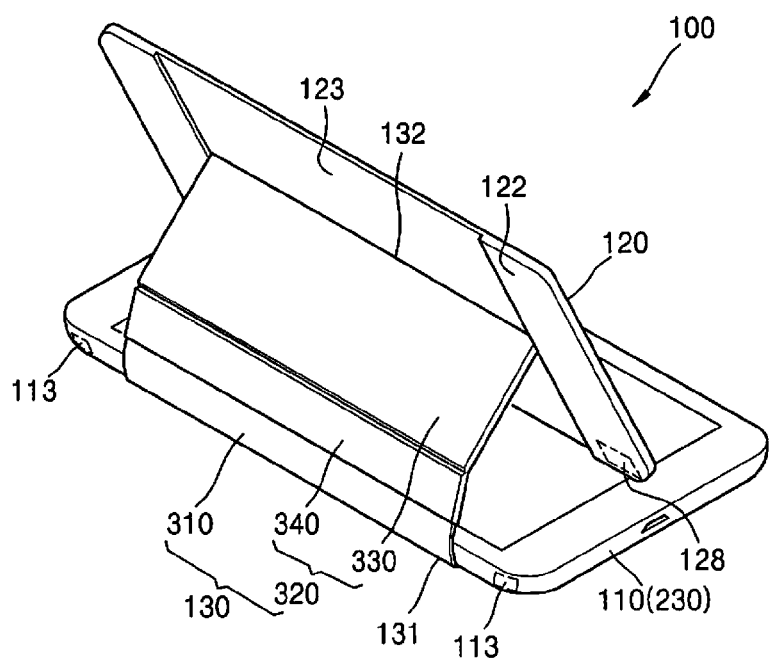
FIG. 12 is a perspective view of a protection case illustrating a second connection portion of the protection case, including a plurality of segment members which are connected with one another so as to pivot, according to an embodiment of the present invention.

FIG. 12 is a perspective view of a protection case illustrating a second connection portion of the protection case, including a plurality of segment members which are connected with one another so as to pivot, according to an embodiment of the present invention.

Referring to FIG. 12, the second connection portion 320 includes a first segment member 330 extending from the second end portion 132 and a second segment member 340 pivotably connected to the first segment member 330. The second segment member 340 is connected to the first connection portion 310. In FIG. 12, the same connection structure as that of the joints 161 and 162 shown in FIG. 7 is used as a connection structure connecting the first segment member 330 and the second segment member 340 and as a connection structure connecting the second segment member 340 and the first connection portion 310. However, the embodiments of the present invention are not limited thereto, and the hinge structure illustrated in FIG. 8 may be used in at least a portion of the above-described connection structures. The first and second segment members 330 and 340 may be adhered to the flip cover 120 via a magnetic force as has been described with reference to FIGS. 9 and 10. That is, the magnet 180 may be disposed on the first and second segment members 330 and 340, or alternatively, the magnet 180 may be disposed on the flip cover 120.

Figure 13:
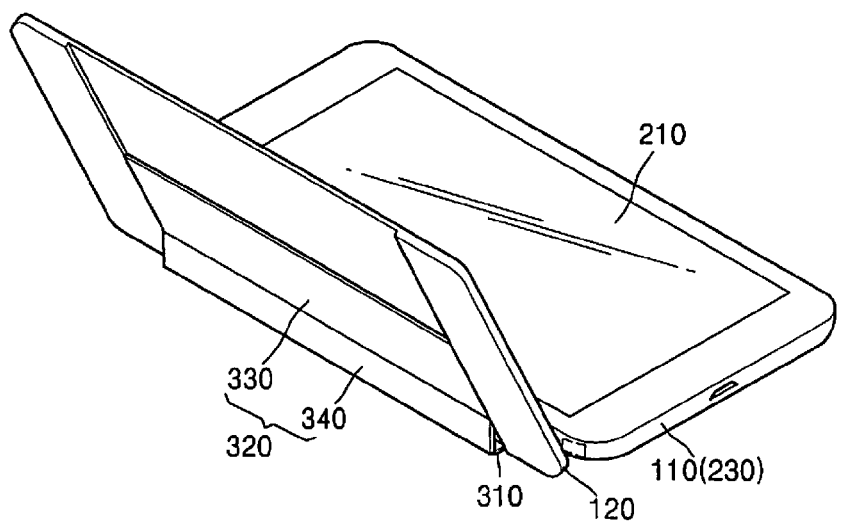
FIGS. 13 and 14 are perspective views of a protection case, illustrating a state in which an auxiliary display of a flip cover of the protection case is positioned perpendicular to a base cover of the protection case and maintained at a predetermined angle with respect to the base cover, according to an embodiment of the present invention.
Figure 14:
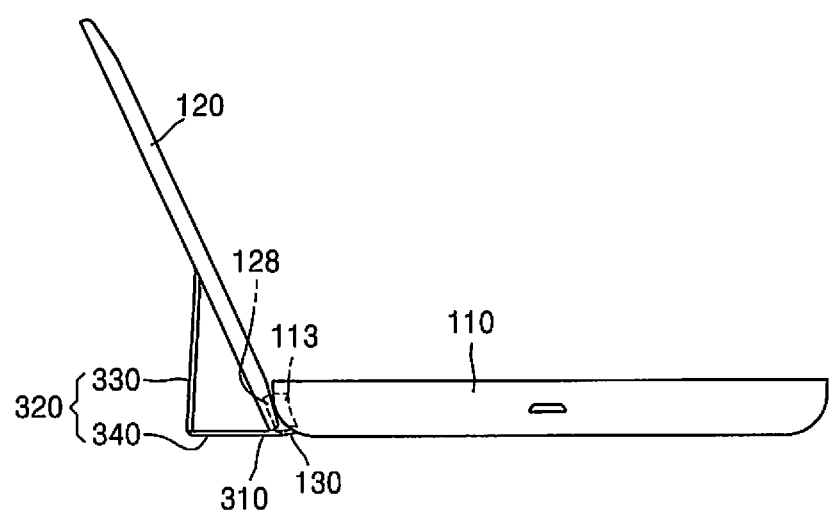

FIGS. 13 and 14 are perspective views of a protection case, illustrating a state in which an auxiliary display of a flip cover of the protection case is positioned perpendicular to a base cover of the protection case and maintained at a predetermined angle with respect to the base cover, according to an embodiment of the present invention.

Referring to FIG. 13, while the flip cover 120 is located at the first position and positioned perpendicular to the base cover 110 with the auxiliary display 140 facing in the direction of the main display 201, the first segment member 330 is adhered to the flip cover 120, and the second segment member 340 is pivoted with respect to the first segment member 330 to be inclined with respect to the flip cover 120. Accordingly, the second segment member 320 functions as a support to the flip cover 120 so that the flip cover 120 is maintained in a state illustrated in FIG. 12.

Referring to FIG. 14, the second segment member 340 is supported, for example, by a table on which the electronic device is placed, and the first segment member 330 is separated from the flip cover 120 to be inclined with respect to the flip cover 120. Thus, as the first segment member 330 functions as a support, the flip cover 120 is maintained in a more inclined state than FIG. 13.

According to the embodiment shown in FIGS. 12 through 14, in order to maintain the flip cover 120 in an inclined state more stably, edge portions of the flip cover 120 and the base cover 110 that are adjacent to the connection portion 130, that is, to the first end portion 131, may be adhered to each other via a magnetic force. To this end, for example, as illustrated in FIG. 12, a magnet 113 is disposed on the edge portion of the base cover 110 adjacent to the first end portion 131, and an adhesion member 128 such as an iron plate is disposed on the edge portion of the flip cover 120. According to this structure, the flip cover 120 is maintained stably while being inclined with respect to the base cover 110.

According to the above-described embodiment, the second connection portion 320 includes two segment members, the first and second segment members 330 and 340, which are pivotally connected to each other. However, the embodiments of the present invention are not limited thereto. A second connection portion 320 including three or more segment members that are pivotably connected to one another may be included so as to maintain the auxiliary display 140 at various inclination angles with respect to the base cover 110.

As described above, according to the protection case and the electronic device including the same of the one or more embodiments of the present invention, a position of the auxiliary display may be converted to the first position at which the auxiliary display is hidden inside and the second position at which the auxiliary display is exposed to the outside by simple manipulation of rotating the flip cover. Thus, user convenience may be improved.

Also, by adhering the connection portion and the flip cover to each other via a magnetic force at the first and second positions, the position of the auxiliary display may be stably maintained.

Also, by detecting the position of the auxiliary display, image information may be displayed on the auxiliary display or the electronic device, according to the position of the auxiliary display.

Also, by using the second connection portion including a plurality of segment members that are pivotably connected to one another, the auxiliary display may be maintained in an inclined state with respect to the base cover at a predetermined angle.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A protection case for an electronic device, comprising:
   a base cover in which an electronic device including a main display is accommodated;
   a flip cover, which includes an auxiliary display on a front surface portion of the flip cover; and
   a connection portion, which connects the flip cover to the base cover, such that
   the flip cover is converted to:
      a closed position where the main display is covered with the flip cover,
      an opened position where the main display is exposed,
      a first position where the main display is covered with the flip cover and the auxiliary display is hidden inside, and
      a second position where the main display is covered with the flip cover and the auxiliary display is exposed to the outside,
   wherein the connection portion comprises:
      a first end portion connected to the base cover, and
      a second end portion extended from the first end portion and connected to a center portion of a rear surface portion of the flip cover, and
   wherein the flip cover is pivotably connected to the second end portion to be moved to the first position and the second position.

2. The protection case of claim 1, wherein a depression portion is formed in the rear surface portion, and the second end portion is connected to the depression portion.

3. The protection case of claim 2, wherein the depression portion has a depth that is greater than or equal to a thickness of a portion of the connection portion that overlaps the flip cover.

4. The protection case of claim 1, wherein the connection portion further comprises:
   a first connection portion that is extended from the first end portion and is foldable; and a second connection portion that is extended from the second end portion and is connected to the first connection portion and overlaps the flip cover.

5. The protection case of claim 4, wherein when the flip cover is located at the first position or the second position, the second connection portion is adhered to the flip cover via a magnetic force.

6. The protection case of claim 4, wherein the second connection portion includes a plurality of segment members which are pivotably connected to one another, and
wherein when the flip cover is located at the first position, the plurality of segment members are at a position where the segment members are adhered to the flip cover via a magnetic force or are at a position where the segment members support the flip cover at a predetermined inclination angle.

7. The protection case of claim 6, wherein edges of the flip cover and the base cover that are adjacent to the connection portion are adhered to each other via the magnetic force.

8. The protection case of claim 4, further comprising a position detecting unit which detects at which of the first position and the second position the flip cover is located.

9. The protection case of claim 8, wherein the position detecting unit comprises:
a magnet disposed on the second connection portion; and
first and second magnetic sensors disposed on the flip cover so as to be spaced apart from each other with the center portion disposed between the first and second magnetic sensors.

10. The protection case of claim 1, wherein the base cover is a battery cover of the electronic device.

11. An electronic device comprising:
a main body including a main display;
a battery cover which accommodates the main body such that the main display is exposed;
a flip cover including an auxiliary display on a front surface portion of the flip cover; and
a connection portion which connects the flip cover to the battery cover, such that the flip cover is converted to:
a closed position where the main display is covered with the flip cover,
an opened position where the main display is exposed,
a first position where the main display is covered with the flip cover and the auxiliary display is hidden inside, and
a second position where the main display is covered with the flip cover and the auxiliary display is exposed to the outside,
wherein the connection portion comprises:
a first end portion connected to the battery cover, and
a second end portion extended from the first end portion and connected to a center portion of a rear surface portion of the flip cover, and
wherein the flip cover is pivotably connected to the second end portion to be moved to the first position and the second position.

12. The electronic device of claim 11, wherein a depression portion is formed in the rear surface portion,
the second end portion is connected to the depression portion, and
the depression portion has a depth that is greater than or equal to a thickness of a portion of the connection portion that overlaps the flip cover.

13. The electronic device of claim 11, wherein the connection portion further comprises:
a first connection portion that is extended from the first end portion and is foldable; and
a second connection portion that is extended from the second end portion and is connected to the first connection portion and overlaps the flip cover.

14. The electronic device of claim 13, wherein when the flip cover is located at the first position or the second position, the second connection portion is adhered to the flip cover via a magnetic force.

15. The electronic device of claim 14, wherein the second connection portion includes a plurality of segment members that are pivotably connected to one another, and
wherein the plurality of segment members are at a position where the segment members are adhered to the flip cover via the magnetic force or are at a position where the segment members support the flip cover at a predetermined inclination angle.

16. The electronic device of claim 15, wherein edges of the flip cover and the battery cover that are adjacent to the connection portion are adhered to each other via the magnetic force.

17. The electronic device of claim 13, further comprising a position detecting unit which detects at which of the first position and the second position the flip cover is located.

18. The electronic device of claim 17, wherein the position detecting unit comprises:
first and second magnets that are asymmetrically disposed on the flip cover with respect to the center portion; and
first and second magnetic sensors that are disposed on the main body and detect the first and second magnets, respectively, at the first position and the second position.

* * * * *